Patented Mar. 31, 1942

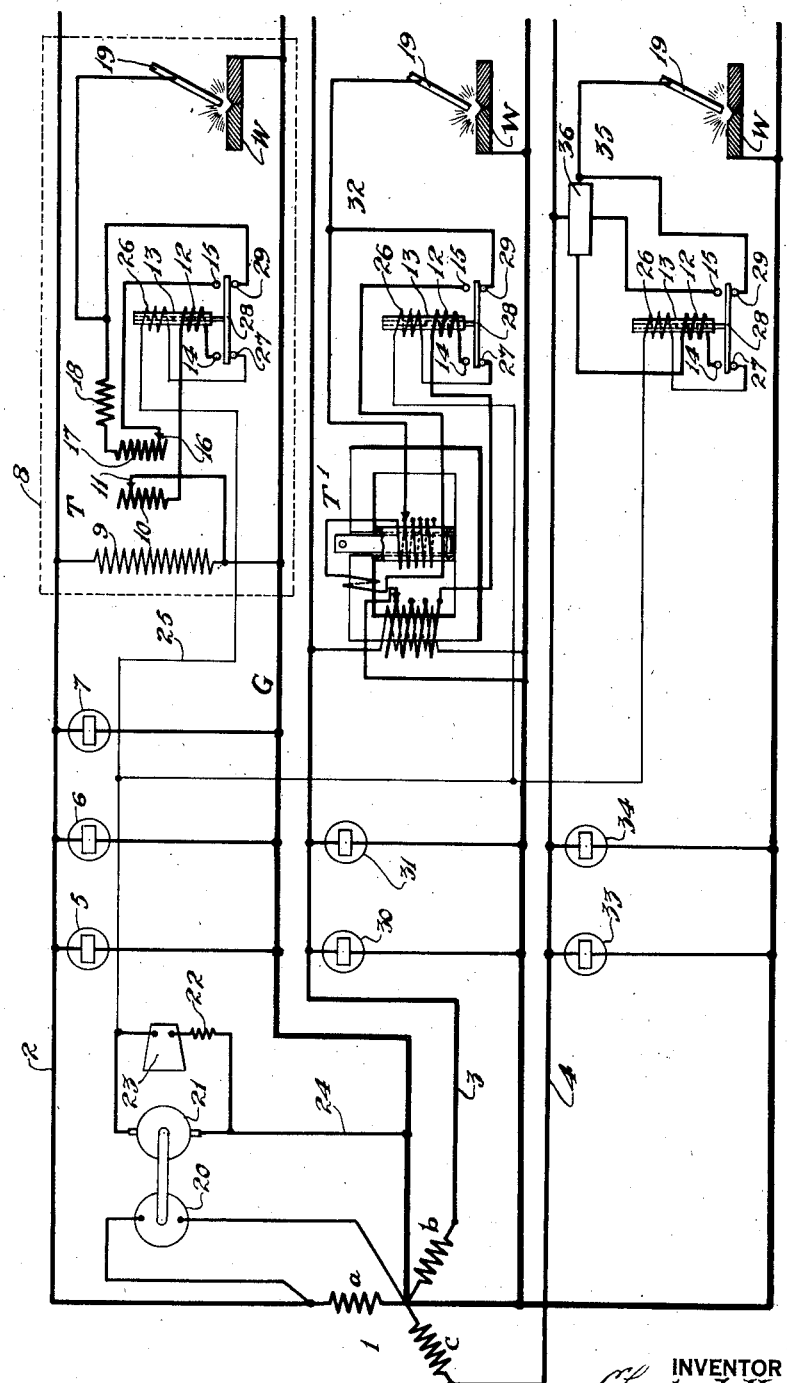

2,277,909

UNITED STATES PATENT OFFICE 2,277,909

ARC WELDING SYSTEM

Claude J. Holslag, South Orange, N. J., assignor to Electric Arc, Inc., Newark, N. J.

Application May 20, 1941, Serial No. 394,253

5 Claims. (Cl. 219—8)

This invention relates to an electric arc welding system and is directed, primarily, to means for starting the arc where the source of welding current is alternating in character.

At the present time, practically all the distribution systems use alternating current and I have found, from years of experience in the designing, construction and operation of alternating current arc welding machines, that they have many advantages over direct current arc welding machines; for example, first cost, cost of operation and type of welds produced.

In the early days of alternating current arc welding, one objection raised was the high open circuit voltage which then seemed to be necessary to give ease in starting the arc. However, in the last few years, new designs have produced a lower open circuit voltage, but in some cases where the requirement for a low open circuit voltage is made, some difficulty has been encountered in starting the arc between the work and the movable electrode. This trouble is due, primarily, to the fact that the alternating current cycle carries it through a zero value, so that the average voltage is too low for easy starting.

To overcome this difficulty and satisfy the condition of low open circuit voltage, or entire removal of a relatively high open circuit voltage from the welding electrodes, I have conceived and put into practice a welding system in which a direct current of relatively low voltage is initially applied to the welding electrodes for starting the arc, and immediately thereafter automatically switching to the alternating current for the continuous welding operations. I have found that this arrangement is preferable to the numerous arrangements which have been heretofore proposed, of superimposing a high frequency alternating current across the arc for breaking down the gap and allowing the A. C. welding current to follow through. One of the objections to the high frequency current is probably psychological. The operator sees the spark and may even feel a tingle through his gloves, as most welders use gloves for various reasons.

I have chosen to illustrate my invention in connection with a multiple-star system such as shown in my Patent 2,025,207, issued December 24, 1935, wherein a main source of current or "mother" transformer is used to supply alternating current to a plurality of welders who are positioned a considerable distance from the main welding transformer. Each operator or station is provided with some type of booster equipment such as shown in my patent above referred to, although it is to be understood that my invention is applicable to a single A. C. welding machine which may derive its power direct from the main feeding power to other apparatus.

In the drawing, 1 is a feed transformer having phases a, b and c star-connected and having supply leads 2, 3 and 4 running out to various welding stations in a welding shop or factory. The stations connected to the supply lead 2 are numbered 5, 6, 7 and 8. The apparatus at 8 shows transformer winding such as illustrated in my Patent 1,305,363, wherein the primary winding 9 of the welding or booster transformer T is connected across the phase a, the core members of the transformer T not being illustrated as reference may be made to my welding Patent 1,305,363.

The main secondary 10 has one end connected through a shifting contact member 11 to the common or ground return G. The other end of the main secondary is connected through a heavy current coil 12 of a relay device 13 which may be of any satisfactory type. The winding 12 terminates in a relay contact 14. A cooperating contact 15 is connected to a shiftable contact 16 on the auxiliary winding 17 of the welding transformer T. The auxiliary secondary winding 17 is connected to yoke turns 18 which, in turn, are connected to the movable electrode 19 shown in operative relation with respect to the work W.

The source of direct current is illustrated as a motor generator set having a motor 20 and a generator 21. The motor 20 is illustrated as of a single-phase type connected across the phase a, although it may be of a polyphase type and connected accordingly. The generator 21 has a shunt field winding 22 and a control rheostat 23. One side of the generator 21 is connected by the lead 24 to the ground return wire of the phase a system. The other side of the generator 21 is connected by a lead 25 to a winding 26 on the relay 13 the opposite end of the winding 26 being connected to a contact 27 which is initially connected by the contact member 28 to a contact 29 connected to a terminal of the transformer T.

The voltage of the D. C. generator 21 is on the order of thirty-five and it will be understood, from the description, that this voltage is normally connected through the contacts 27 and 29 to the welding electrodes. As soon as an arc has been struck, the current flow through the winding 26 will operate the relay 13, closing a circuit through the member 28 from the contact 14 to the contact 15, thereby closing a circuit through the A. C. welding transformer to the electrodes, and the welding will be performed by the alternating current power until such time as the electrode 19 is used up or the arc goes out for any reason, after which the cycle will be repeated.

In connection with the phase b, I have shown stations 30, 31 and 32, the transformer T' at the station 32 being of the type shown in my Patent 2,192,312, issued March 5, 1940. However, the switching operation from D. C. to A. C. is the same as the phase a.

In phase c I have shown stations 33, 34 and 35, the booster or welding unit 36 at the station 35 being shown diagrammatically, as it may be either of the forms T—T' or any other satisfactory type of booster or control unit, such as an auto-transformer.

In the use of this transfer arrangement from D. C. starting to A. C. welding, it is to be understood that only a few hundredths of a second are required for the A. C. arc to be substituted for the D. C. starting arc. While I have shown a motor generator set for a source of direct current, it may be any other source of direct current such as a rectifier or storage battery, and in either case, the unit required will be very small as compared with the "mother" transformer 1, because it only has to supply what in effect is an instantaneous starting current, and even though a number of operators should start striking an arc simultaneously, the overload, if any, on the source of direct current would be only momentary.

What I claim is:

1. In arc welding system, a source of alternating current for supplying the arc welding current, a source of direct current with means for initially applying it to the arc electrodes for starting the arc, said means acting to substitute the alternating current for the direct current across the arc directly after the arc is started by the direct current.

2. In an arc welding system, a source of alternating current for supplying the arc welding current, a source of direct current, relay means for initially holding open the alternating current circuit to the electrodes but holding the direct current circuit closed to the electrodes, said relay means acting, on striking an arc with the direct current, to transfer the alternating current across the electrode.

3. In an arc welding system, a source of alternating welding current, a source of direct current and means for utilizing the direct current for striking an arc at the arc electrodes and then transferring the alternating current to the electrodes.

4. In an arc welding system, a source of alternating welding current, a source of direct current and means for utilizing the direct current for striking an arc at the arc electrodes and then automatically cutting off the direct current immediately the arc is started and substituting the alternating current across the arc.

5. In an arc welding system utilizing both alternating and direct currents, means for using only the direct current for starting the arc and then switching to the alternating current for the actual welding operation.

CLAUDE J. HOLSLAG.